United States Patent
Ponnuswamy

(10) Patent No.: US 9,479,954 B2
(45) Date of Patent: *Oct. 25, 2016

(54) CORRELATING DATA FROM MULTIPLE SPECTRUM MONITORS

(71) Applicant: Aruba Networks, Inc., Sunnyvale, CA (US)

(72) Inventor: Subburajan Ponnuswamy, Saratoga, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/691,462

(22) Filed: Apr. 20, 2015

(65) Prior Publication Data

US 2015/0230110 A1   Aug. 13, 2015

Related U.S. Application Data

(63) Continuation of application No. 13/179,057, filed on Jul. 8, 2011, now Pat. No. 9,014,021.

(60) Provisional application No. 61/363,108, filed on Jul. 9, 2010.

(51) Int. Cl.

| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 12/26* | (2006.01) |
| *H04W 24/08* | (2009.01) |

(Continued)

(52) U.S. Cl.
CPC ............. *H04W 24/08* (2013.01); *H04W 24/06* (2013.01); *H04W 8/005* (2013.01)

(58) Field of Classification Search
USPC ................................................. 370/252, 328
See application file for complete search history.

(56) References Cited

U.S. PATENT DOCUMENTS

| 6,463,287 B1 | 10/2002 | Wegner |
| 6,850,735 B2 | 2/2005 | Sugar et al. |
| 7,079,812 B2 | 7/2006 | Miller et al. |

(Continued)

OTHER PUBLICATIONS

Non-Final Office Action in U.S. Appl. No. 13/080,539 dated Feb. 21, 2013. 18 pages.

(Continued)

*Primary Examiner* — Gregory Sefcheck
*Assistant Examiner* — Majid Esmaeilian
(74) *Attorney, Agent, or Firm* — Hewlett Packard Enterprise Patent Department

(57) ABSTRACT

A combination and correlation of data from multiple sensors in a wireless digital network is described. Sensors such as spectrum monitors, access points, and wireless client devices provide spectrum data to one or more central stations connected to the network. Spectrum data from multiple sensors is combined and correlated to provide insight into network operation such as spectrum maps, detection-range maps, and for network diagnostics. Sensors providing spectrum data may be synchronized. Correlating spectrum data from synchronized sensors allows more accurate location of sources such as interferers. The known EIRP of certain wireless devices may be used to improve location estimates, and these devices may be used as calibrations sources for sensors in the wireless network.

20 Claims, 1 Drawing Sheet

(51) Int. Cl.
*H04W 24/06* (2009.01)
*H04W 8/00* (2009.01)

(56) References Cited

U.S. PATENT DOCUMENTS

| | | | |
|---|---|---|---|
| 7,184,777 | B2 | 2/2007 | Diener et al. |
| 7,460,837 | B2 | 12/2008 | Diener |
| 7,596,181 | B2 | 9/2009 | Chang et al. |
| 7,633,901 | B2 | 12/2009 | Yuen et al. |
| 7,653,020 | B2 | 1/2010 | Roberts |
| 7,715,800 | B2 | 5/2010 | Sinha |
| 7,929,508 | B1 | 4/2011 | Yucek et al. |
| 8,340,578 | B2 | 12/2012 | Tolentino et al. |
| 8,457,023 | B2 | 6/2013 | Norlen et al. |
| 8,885,499 | B2 | 11/2014 | Ponnuswamy |
| 9,014,021 | B2* | 4/2015 | Ponnuswamy ....... H04W 24/08 370/252 |
| 2002/0191564 | A1 | 12/2002 | Kuo |
| 2004/0013128 | A1 | 1/2004 | Moreton et al. |
| 2004/0023674 | A1 | 2/2004 | Miller |
| 2004/0028003 | A1 | 2/2004 | Diener et al. |
| 2004/0028123 | A1 | 2/2004 | Sugar et al. |
| 2004/0137915 | A1* | 7/2004 | Diener ................. H04L 41/0896 455/456.1 |
| 2004/0185861 | A1 | 9/2004 | Domon et al. |
| 2004/0203392 | A1 | 10/2004 | Hsu et al. |
| 2004/0208133 | A1 | 10/2004 | Jay et al. |
| 2005/0053094 | A1 | 3/2005 | Cain et al. |
| 2005/0059400 | A1 | 3/2005 | Jagadeesan et al. |
| 2005/0111415 | A1 | 5/2005 | Soomro et al. |
| 2005/0159109 | A1 | 7/2005 | Kivekas et al. |
| 2005/0227625 | A1 | 10/2005 | Diener |
| 2005/0285792 | A1* | 12/2005 | Sugar .................... G01S 5/0252 342/465 |
| 2006/0079286 | A1 | 4/2006 | Ochi et al. |
| 2006/0089149 | A1 | 4/2006 | Kizu et al. |
| 2007/0104129 | A1 | 5/2007 | Yang et al. |
| 2007/0165535 | A1 | 7/2007 | Zou et al. |
| 2008/0025259 | A1 | 1/2008 | Ponnuswamy et al. |
| 2008/0151751 | A1 | 6/2008 | Ponnuswamy et al. |
| 2008/0200195 | A1 | 8/2008 | Abe et al. |
| 2008/0227401 | A1 | 9/2008 | Scherzer et al. |
| 2008/0279093 | A1 | 11/2008 | Hassan et al. |
| 2009/0003413 | A1 | 1/2009 | Jang et al. |
| 2009/0046625 | A1* | 2/2009 | Diener .................. H04L 1/0001 370/319 |
| 2009/0310497 | A1 | 12/2009 | Wakamatsu |
| 2009/0313520 | A1 | 12/2009 | Chung et al. |
| 2010/0075704 | A1 | 3/2010 | McHenry et al. |
| 2010/0124886 | A1* | 5/2010 | Fordham ............... H04B 17/382 455/67.11 |
| 2012/0171978 | A1* | 7/2012 | Sharma ................ H04B 1/1638 455/230 |

OTHER PUBLICATIONS

Final Office Action in U.S. Appl. No. 13/080,539 dated Nov. 18, 2013. 7 pages.

Non-Final Office Action in U.S. Appl. No. 13/080,539 dated Mar. 5, 2015. 16 pages.

* cited by examiner

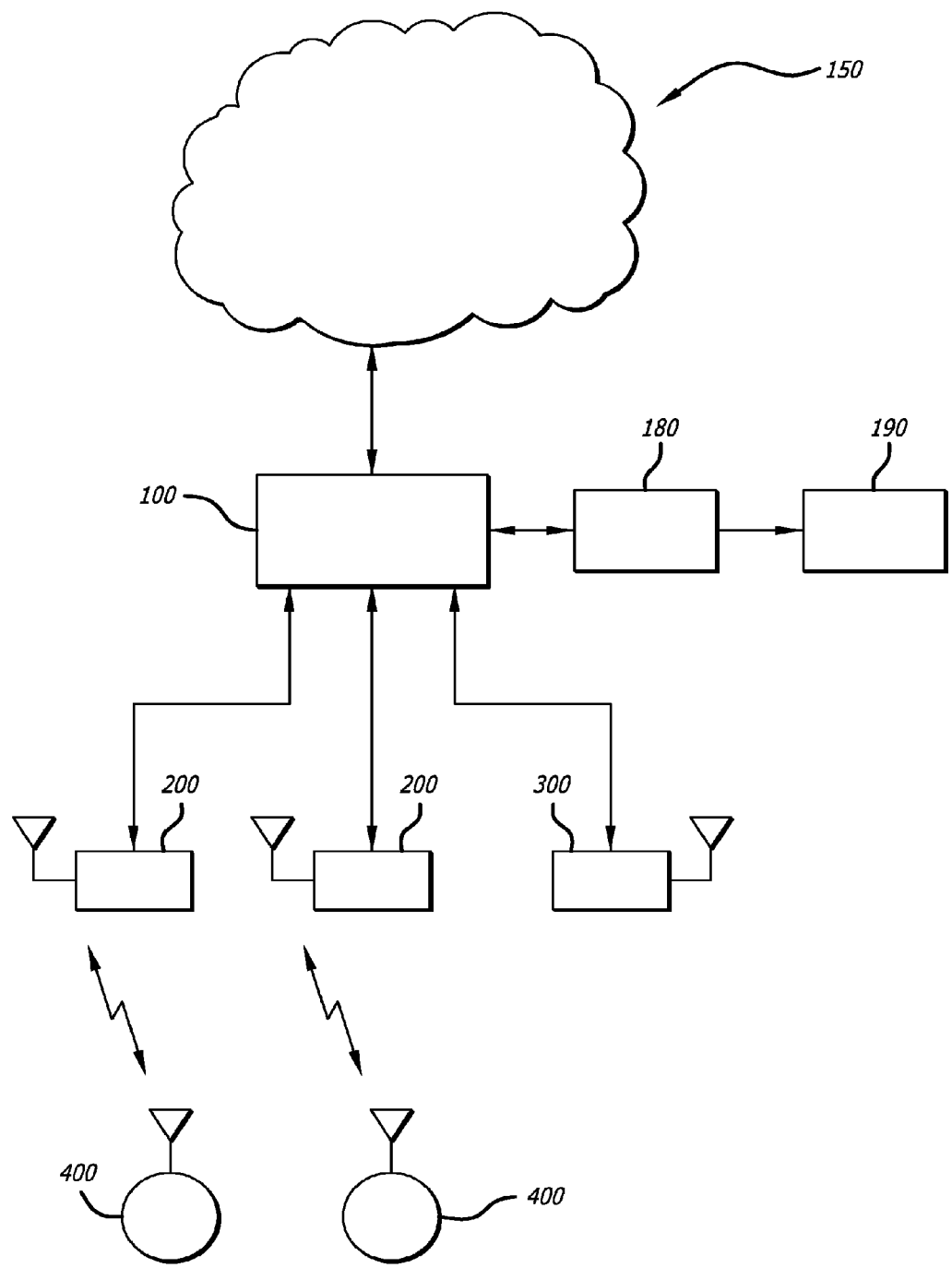

CORRELATING DATA FROM MULTIPLE SPECTRUM MONITORS

CROSS-REFERENCE TO RELATED APPLICATIONS

This application is a continuation of U.S. application Ser. No. 13/179,057 filed Jul. 8, 2011, which claims the benefit of the earlier filing date of U.S. Provisional Application No. 61/363,108, filed on Jul. 9, 2010; the entire contents of which are incorporated herein by reference.

This application is also related to application Ser. No. 13/080,539 filed Apr. 5, 2011 and entitled "Measuring and Displaying Wireless Network Quality"; the entire contents of which are incorporated herein by reference.

BACKGROUND OF THE INVENTION

The present invention relates to monitoring wireless digital networks, and more particularly, to combining data from multiple sensors in a wireless network.

Wireless digital networks are becoming ubiquitous in enterprises, providing secure and cost-effective access to resources. Those networks usually have one or more controllers, each controller supporting a plurality of access points (AP) deployed through the enterprise. WiFi networks operating in accordance with IEEE 802.11 standards are examples of such networks.

Unfortunately, the frequencies used by these networks are shared. They are shared not only among the wireless networks themselves, but also with other non-network radiators. Non-network radiators, devices such as microwave ovens, wireless video streaming devices, cordless phones, and the like, as well as other wireless networking devices, can cause interference with the operation of a network. Interfering devices can come and go, change their nature, and move around. As an example, replacing or adding a microwave oven in an employee lounge area can dramatically alter the interference present to a network.

In searching out sources of interference to a wireless network, various pieces of test equipment such as spectrum analyzers are used. A professional spectrum analyzer has a calibrated receiver of exquisite sensitivity, and is able to display and measure signals over a wide range of frequencies and amplitudes. They also range in price from a few thousand dollars to tens of thousands of dollars, and require a skilled operator. This places them outside the realm of the normal wireless network engineer.

What a digital wireless network does have is a plurality of narrowband radios, in the form of access points and wireless client devices. While these radios may not have the performance of a high quality spectrum analyzer, they are capable of collecting data on narrow portions of the spectrum used by the network.

A typical wireless network may have a plurality of monitoring devices, ranging from dedicated spectrum monitors (SMs), access points (APs) with spectrum monitoring capability, and even client devices with spectrum monitoring capability. These different monitoring devices may have differing capabilities, in terms of measurement capabilities, such as sensitivity, accuracy, response time, resolution bandwidth, measurement bandwidth, and the like.

What is needed is a way of combining or correlating data from multiple monitors to provide a cohesive view of the spectrum of interest.

BRIEF DESCRIPTION OF THE DRAWINGS

The invention may be best understood by referring to the following description and accompanying drawings that are used to illustrate embodiments of the invention in which:

FIG. 1 shows clients in a wireless network.

DETAILED DESCRIPTION

Embodiments of the invention relate to methods of combining and correlating data from multiple sensors in a wireless digital network. Sensors such as spectrum monitors, access points, and wireless client devices provide spectrum data to one or more central stations attached to the network. Spectrum data from multiple sensors is combined and correlated to provide insight into network operation such as spectrum maps, detection-range maps, and for network diagnostics. Spectrum data may include time domain information such as Physical Layer (PHY) errors, incorrectly received 802.11 frames, noise, channel utilization, as well as frequency domain information such as FFT. Sensors providing spectrum data may be synchronized. Correlating spectrum data from synchronized sensors allows more accurate location of sources such as interferers. The known Effective Isotropically Radiated Power (EIRP) of certain wireless devices may be used to improve location estimates, and these devices may be used as calibrations sources for sensors in the wireless network.

FIG. 1 shows a network in which controller 100 communicates with a digital network such as the Internet 150. Controller 100 also supports devices such as access points (AP) 200 and spectrum monitors (SM) 300. Wireless client devices 400 connect to APs 200 and access services such as the Internet 150 through controller 100.

Also shown in FIG. 1 is monitoring process 180 and display 190. While shown as a separate device communicating with controller 100, the monitoring process may operate within controller 100, or on any suitable computing device attached to the network, such as a laptop or desktop computer.

As is known to the art, controller 100, APs 200, and spectrum monitor 300 are purpose-made digital devices, each containing a processor, memory hierarchy, and input-output interfaces. In one embodiment of the invention, a MIPS-class processor such as those from Cavium or RMI is used. Other suitable processors, such as those from Intel or AMD may also be used. The memory hierarchy traditionally comprises fast read/write memory for holding processor data and instructions while operating, and nonvolatile memory such as EEPROM and/or Flash for storing files and system startup information. Wired interfaces are typically IEEE 802.3 Ethernet interfaces, used for wired connections to other network devices such as switches, or to a controller. Wireless interfaces may be WiMAX, 3G, 4G, and/or IEEE 802.11 wireless interfaces. In one embodiment of the invention, controllers and hotspot APs operate under control of a LINUX® operating system, with purpose-built programs providing host controller and access point functionality.

Wireless client devices 400 contain a processor, memory hierarchy, and a number of interfaces including a wireless interface for communicating with APs 200. Typical wireless client devices include personal computers, handheld and tablet computers, Wi-Fi phones, wireless barcode scanners, and the like.

Traditional spectrum analyzers use wideband receivers so that they can monitor the entire frequency spectrum of interest at all times. The advantage of wideband receivers is that Fast Fourier Transform (FFT) data can be collected and processed in real-time for an entire band to support the display of real-time FFT, FFT average, and FFT duty cycle. Traditional spectrum analyzers use purpose built hardware with specialized spectrum analysis software.

According to the present invention, dedicated spectrum monitors (SM), access points (AP) with spectrum monitor capabilities, and even wireless client devices with spectrum monitor capabilities are used to collect spectrum information. Each device collects spectrum metrics according to its capabilities.

In one embodiment of the invention, the spectrum metrics or data calculated or measured at multiple spectrum monitors spread across a building or floor are aggregated and displayed using a range of colors on a building/floor map. The spectrum-map display mimics the heat-map display commonly used to represent the communication range or coverage of wireless devices. The receive sensitivity of the radio in spectrum monitor mode combined with the antenna gain of the spectrum monitor is used to calculate the true range of a spectrum monitor, known as the spectrum range. When directional or beam-forming antennas are used by the spectrum monitor, the antenna pattern of the specific monitor is used to determine the area within the map.

Unlike the heat-map displaying a coverage map based on the transmit characteristics of wireless devices on a floor or building, the spectrum-map uses the receive capability of spectrum monitors to mark an area within the map. Information regarding building materials, building structure, and other information related to the building/floor architecture may be used to further enhance the spectrum range. Depending on the type of spectrum metrics or data, the spectrum range of a specific spectrum monitor may be marked with a single color or with a range of colors on a spectrum-map.

The spectrum-map is used to display a metric on a floor or building map based on a specific combination of configured or selected channels. For example, a wireless deployment may use channels 36+, 44+, and 52+, where the "+" indicates 40 MHz channels, on a specific floor. In one view of the spectrum-map, known as the deployment view, the displayed metrics will correspond to the channel that is being used at that specific point on the map. When more than one channel is active on a specific point on the map, the channel with specific criteria such as the highest signal strength or highest duty cycle is used for the display. In yet another view, known as the channel view, a specific channel such as 36+ may be selected for the floor/building-wide view and the spectrum metrics displayed on the entire floor/building will correspond to that specific channel.

When adaptive RF management (ARM) is used, the deployment view may be dynamically adjusted to reflect the changes in channel planning and/or receive sensitivity, if any.

The spectrum-map may be used to display any spectrum metrics, including but not limited to, channel quality, link quality, channel availability, interference level, frame error rate, non-Wi-Fi duty cycle, Wi-Fi duty cycle, aggregate channel usage, and channel usage or duty cycles for specific type of traffic or devices.

As described in U.S. patent application Ser. No. 13/080, 539 filed Apr. 5, 2011, entitled "Measuring and Displaying Wireless Network Quality," by the present inventor, incorporated herein by reference, the channel quality metric is calculated per spectrum monitor. The channel quality, which is a single value (e.g., between 0 and 100), calculated from a specific spectrum monitor can be mapped to a single color for a specific channel and displayed on a deployment or channel view.

When more than one spectrum monitor provides spectrum data for a specific point in the spectrum-map, one or more of the following algorithms is used to select the best data to be displayed for that point:

a. Average of all the known values. Values may be weighted or otherwise scaled. Similarly, values may be averaged over time, and may be subject to smoothing using known techniques.

b. Data from the spectrum monitor that is closest to that point.

c. Assign a confidence value to each data point and choose the data with the highest confidence. The methods for assigning confidence value may be based on the distance or the quality of the data or other metrics such as the amount of time spent on that channel by the spectrum monitor, the amount of activity detected on that channel, the difference in activity level or quality between successive readings on the same channel, the past performance of the particular monitor, or a confidence level assigned to that spectrum monitor or type of spectrum monitor.

In another method, a spectrum monitor detection-range map is displayed per floor or building. In the detection-range map, the color for specific point on the map is determined based the ability of a spectrum monitor to receive or detect a device, with a radiated power or strength above a specific value, located at that point. For example, a point closer to a spectrum monitor may be marked with a color to indicate that any signal that is at least 3 dB above nominal noise floor or a specific signal strength can be detected by the spectrum monitor. Another point in the map little further away may be marked with a different color to indicate that any signal from that point that is at least 6 dB above nominal noise floor can be detected by the spectrum monitor and so on.

When multiple spectrum monitors are able to serve a specific point on the detection-range map, the color displayed for that specific point will be based on the detection range of the closest spectrum monitor, i.e., one that requires the least signal strength to be detected.

A variation of the spectrum-monitor detection-range map is used to display the detection-range for a specific type of interferer. The typical or known radiated power of a specific type of interferer (e.g., cordless phone or Xbox®) is used to calculate the detection-range for that specific device. The users may also specify a radiated power to be used for a specific interferer in calculating the detection-range of that device. This is especially useful for interfering devices such as Microwave and Bluetooth which may have varying power levels depending on the type, class or manufacturer.

In another method, the detection-range maps are used as a planning tool to determine the minimum number of Spectrum Monitors (SM) or Access Points (AP) with spectrum monitoring capability that need to be deployed on a floor or building.

In another application according to the invention, the information from detection-range calculation is used by the RF management module (ARM) to determine the minimum number and type of spectrum monitoring devices (SMs or APs) that need to be enabled at any time based on dynamic conditions.

In yet another embodiment of this method, the various metrics calculated for floor or building-wide spectrum maps are used for identifying, diagnosing and reporting network or channel problems. In one method, changes in one or more metric or parameter is correlated to determine the cause of wireless performance or connectivity issues. In another method, the changes in metrics along with specific events such as the detection or classification of an interferer and IEEE 802.11 client connectivity problems observed by monitoring IEEE 802.11 management frame exchanges are correlated to identify the type of problems and generate reports to the users. For example, within a specific area with a high error rate or low link quality, other metrics such as interferer duty cycle may be used to isolate the source of network quality problems.

In another method, the devices with spectrum capability are time synchronized such that the timers on the spectrum monitoring devices are in sync. Some devices may have timers with microsecond accuracy while others may have higher resolution timers such as in nanoseconds. The radios on the spectrum monitoring devices synchronize their internal timers such as the TSF (Time Synchronization Function) timers. The microsecond resolution TSF timers are used for IEEE 802.11 protocol synchronization. Using these synchronized timers, every event that is detected by the radio such as an FFT sample or 802.11 frames are time-stamped. The methods for synchronizing timers across networked devices are known to the art (e.g. IEEE 802.1AS and IEEE 1588). The present invention uses synchronized event generation across multiple spectrum monitors to accomplish various diagnostic, detection and location functions.

Each piece of data calculated for every point on all the spectrum maps comes with a timestamp, where the timers are synchronized across multiple monitors. The timestamp may be used to correlate spectrum events to wireless network events that may occur on multiple spectrum monitors. An example of a spectrum event is a detection of an interfering device or an increase in duty cycle or interference level on a specific channel on one or more spectrum monitors. Other examples of wireless network events include disconnects or degradation in performance or changes in link quality. The wireless network events are also time stamped using the synchronized timer. A central process on a controller or a central system such as a management system collects spectrum events and wireless events for correlation. When the timestamps of the spectrum and wireless events are within a certain range, the correlation function reports them as related events. This information may be presented to the user visually on the maps, or in the form of alerts, so that appropriate remedial actions can be taken.

The spectrum monitors and APs in the network are also capable of receiving 802.11 encapsulated frames. An integrated 802.11 packet capture mechanism is used to collect and analyze the frames and aggregate statistics. The correlation of events such as the detection of interferers to 802.11 network behaviors such as frame retries or degradation in link rate shown in the packet capture is used to further diagnose specific wireless performance issues. Once the information is correlated, a summary of spectral events may be provided on a separate view that is linked to specific set of 802.11 frame events on the packet capture display.

Since the spectrum monitoring devices are time synchronized, each FFT sample received by the device is stamped with the synchronized timestamp. Each device performs interferer classification and identifies the presence of interferers. An identified interferer as well as each FFT sample used for the interferer classification has the set of identifying information including, timestamps, signal strength, center frequency, occupied bandwidth, burst size or duration, and interferer type. A central device or process such as a controller or a management system collects the interferer detection events along with the associated FFT sample information.

In order to find the location of the interferers, information gathered from multiple spectrum monitoring devices need to be correlated and triangulated. When an 802.11 device needs to be located, the location algorithm typically uses identifying information such as the 6-octet MAC address or BSSID to identify the devices prior to triangulation. However, spectrum monitoring devices do not have any such identifying data for non-WiFi interferers, as the spectrum monitor radio is not capable of demodulating signals transmitted by the multitude of interfering devices using different modulation techniques.

In the location detection method according to the present invention, FFT samples from multiple spectrum monitors, each with an accurate timestamp are correlated. The correlation process identifies a set of FFT samples from multiple spectrum monitors with the same timestamps (or timestamps within a specific range to account for synchronization and calibration errors if any) that are part of the same interferer as identified by the classification algorithm. This process eliminates the need to have a MAC address or other identifying information. Once this information is known along with the signal strength of the samples, a triangulation method is used to accurately identify the location of the interferers.

Since the spectrum monitor scans multiple channels to collect FFT information and other channel statistics, synchronized scanning is used to synchronize multiple spectrum monitors such that a plurality of monitors are on the same channel at the same time to collect data for the location engine. Such synchronization is not required for APs with spectrum monitoring capability if they do not change channels. A channel scanning schedule along with a start time is communicated by the central process, controller or management system to the spectrum monitors. The spectrum monitors receiving the schedule start scanning the same sequence of channels since they are time synchronized.

The spectrum monitors may remain synchronized for a longer time to detect interfering devices or intentionally configured to scan out of synchronization or use a random scanning sequence.

The synchronized scanning method can not only be used for the triangulation based location algorithms, but also for other methods such as Time of Arrival (TOA), Time Difference of Arrival (TDOA), where comparing the same FFT sample at multiple spectrum monitors can enhance the location accuracy.

Some devices may have known radiated power or EIRP. For example, once a device is identified as an Xbox®, the EIRP of the device is known, as the device has a known antenna system and a known transmit power. Similarly, the EIRP of certain cordless phones or Bluetooth devices may be known to the location engine. The location engine uses such known EIRP to further refine the location of the device.

The location engine may use such devices having known EIRP to serve as calibration sources for other spectrum monitors.

The methods described here may be implemented on a radio that is stationary such as an Access Point (AP) or Spectrum Monitor (SM), or a radio that may be mobile such as a laptop or a handheld device.

The locations of fixed radios such as APs and SMs are known to the system. When spectrum monitors are implemented on a mobile device, the device dynamically determines its location relative to the APs or the APs determine the location of the mobile spectrum monitors using location methods such as triangulation as known to the art.

The location of the mobile device along with other identifying information such as the MAC address or user may be displayed on the floor/building map.

The location of the mobile device is used for event correlation where spectrum and wireless events within a neighborhood are correlated.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a plurality of purpose-built access points (AP) and spectrum monitors (SM) connected over a network to a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method comprising:
   correlating, by a network device, spectrum data received on a channel from a plurality of spectrum monitors, wherein the spectrum data from each spectrum monitor is characterized by timestamps, and at least one of radio frequencies and radio frequency (RF) source types associated with the plurality of timestamps;
   identifying, by the network device, a unique RF source, wherein identifying includes using respective spectrum data received from a subset of the plurality of spectrum monitors, wherein the respective spectrum data from each spectrum monitor in the subset of spectrum monitors shares an overlapping timestamp range, and at least one of an overlapping frequency range and an identical RF source type;
   displaying, by the network device, selected spectrum data on a map with a plurality of colors, wherein a respective color displayed at a respective location is based on a detection range of one of the plurality of spectrum monitors located closest to the respective location and indicates an ability of the closest spectrum monitor to detect a device located at the location with a radiated power or strength above a threshold;
   using triangulation to determine a location of an interfering device after correlating a set of fast Fourier transform (FFT) samples from the subset of spectrum monitors that share an overlapping timestamp range and that correspond to the same interfering device; and
   refining the location of the interfering device based on a known Effective Isotropically Radiated Power (EIRP) of the interfering device.

2. The method of claim 1, wherein identifying the unique RF source further comprises identifying a presence of an interfering device and a classification corresponding to the interfering device.

3. The method of claim 1, wherein each spectrum monitor comprises a timer which generates a timestamp for a spectrum event, and wherein the timer is synchronized with one or more other timers from the plurality of spectrum monitors.

4. The method of claim 3, further comprising:
   synchronizing, by the network device, scanning by a respective spectrum monitor with other spectrum monitors that collect spectrum data on the same channel at the same time as the respective spectrum monitor.

5. The method of claim 3, wherein the spectrum event comprises one or more of:
   a detection of an interfering device;
   an increase in a duty cycle on the channel;
   an increase in an interference level on the channel;
   a disconnection of a device;
   a degradation in performance of a device; and
   a change in link qualities.

6. The method of claim 1, further comprising:
   receiving, by the network device, a channel scanning schedule, wherein the channel scanning schedule comprises a channel scanning sequence, a start time, and a dwell time, and wherein the channel scanning schedule is sent to the plurality of spectrum monitors.

7. The method of claim 1, wherein the spectrum data comprises one or more FFT samples, the FFT samples having interfering device identifying information; and
   wherein the interfering device identifying information comprises one or more of:
   a timestamp, a signal strength, a center frequency, an occupied bandwidth, a burst size, a burst duration, and an interferer type.

8. The method of claim 1, wherein the detected device located at the location is the interfering device.

9. The method of claim 1, wherein the spectrum data is selected based on a difference in signal strengths associated with the spectrum data on the channel received from the plurality of spectrum monitors.

10. The method of claim 1, wherein the spectrum data is selected based on a difference in activity levels on the channel received from the plurality of spectrum monitors.

11. A network device comprising:
    a processor;
    a memory;
    a correlating mechanism operating with the processor, the correlating mechanism to correlate spectrum data received on a channel from a plurality of spectrum monitors, wherein the spectrum data from each spectrum monitor is characterized by timestamps, and at least one of radio frequencies and radio frequency (RF) source types associated with the plurality of timestamps;
    an identifying mechanism operating with the processor, the identifying mechanism to identify a unique RF source using respective spectrum data received from a subset of spectrum monitors, wherein the respective spectrum data from each spectrum monitor in the subset of spectrum monitors share an overlapping timestamp range, and at least one of an overlapping frequency range and an identical RF source type; and a displaying mechanism operating with the processor, the displaying mechanism to display selected spectrum data on a map with a plurality of colors, wherein a respective color displayed at a respective location is determined based on a detection range of one of the plurality of spectrum monitors located closest to the respective location and indicates an ability of the closest spectrum monitor to detect a device located at the location with a radiated power or strength above a threshold, wherein the identifying mechanism further (i) determines a location of an interfering device using triangulation after correlating a set of fast Fourier transform (FFT) samples from the subset of spectrum monitors with an overlapping timestamp range that corresponds to the same interfering device, and (ii) refines the location of the interfering device based on a known Effective Isotropically Radiated Power (EIRP) of the interfering device.

12. The network device of claim 11, wherein the identifying mechanism is to further identify a presence of an interfering device and a classification corresponding to the interfering device.

13. The network device of claim 11, wherein each spectrum monitor comprises a timer which generates a timestamp for a spectrum event, and wherein the timer is synchronized with one or more other timers from the plurality of spectrum monitors.

14. The network device of claim 13, further comprising:
a synchronizing mechanism operating with the processor, the synchronizing mechanism to synchronize scanning by a respective spectrum monitor with other spectrum monitors that collect spectrum data on the same channel at the same time as the respective spectrum monitor.

15. The network device of claim 11, further comprising:
a receiving mechanism operating with the processor, the receiving mechanism to receive a channel scanning schedule, wherein the channel scanning schedule comprises a channel scanning sequence, a start time, and a dwell time, and wherein the channel scanning schedule is sent to the plurality of spectrum monitors.

16. The network device of claim 15, wherein the spectrum event comprises one or more of:
a detection of an interfering device;
an increase in a duty cycle on the channel;
an increase in an interference level on the channel;
a disconnection of a device;
a degradation in performance of a device; and
a change in link qualities.

17. The network device of claim 11, wherein the spectrum data comprises one or more FFT samples, the FFT samples having interfering device identifying information; and wherein the interfering device identifying information comprises one or more of:
a timestamp, a signal strength, a center frequency, an occupied bandwidth, a burst size, a burst duration, and an interferer type.

18. The network device of claim 11, wherein the detected device located at the location is the interfering device.

19. The network device of claim 11, wherein the spectrum data is selected based on a difference in signal strengths associated with the spectrum data on the channel received from the plurality of spectrum monitors or based on a difference in activity levels on the channel received from the plurality of spectrum monitors.

20. A non-transitory computer readable storage medium comprising instructions which, when executed by one or more processors of a network device, cause the network device to:
correlate spectrum data received on a channel from a plurality of spectrum monitors, wherein the spectrum data from each spectrum monitor is characterized by timestamps, and at least one of radio frequencies and radio frequency (RF) source types associated with the plurality of timestamps;
identify a unique RF source, wherein identifying includes using respective spectrum data received from a subset of the plurality of spectrum monitors, wherein the respective spectrum data from each spectrum monitor in the subset of spectrum monitors shares an overlapping timestamp range, and at least one of an overlapping frequency range and an identical RF source type;
display selected spectrum data on a map with a plurality of colors, wherein a respective color displayed at a respective location is based on a detection range of one of the plurality of spectrum monitors located closest to the respective location and indicates an ability of the closest spectrum monitor to detect a device located at the location with a radiated power or strength above a threshold;
determine a location of an interfering device using triangulation after correlating a set of fast Fourier transform (FFT) samples from the subset of spectrum monitors that share an overlapping timestamp range and that correspond to the same interfering device; and
refine the location of the interfering device based on a known Effective Isotropically Radiated Power (EIRP) of the interfering device.

* * * * *